United States Patent Office 3,435,989
Patented Apr. 1, 1969

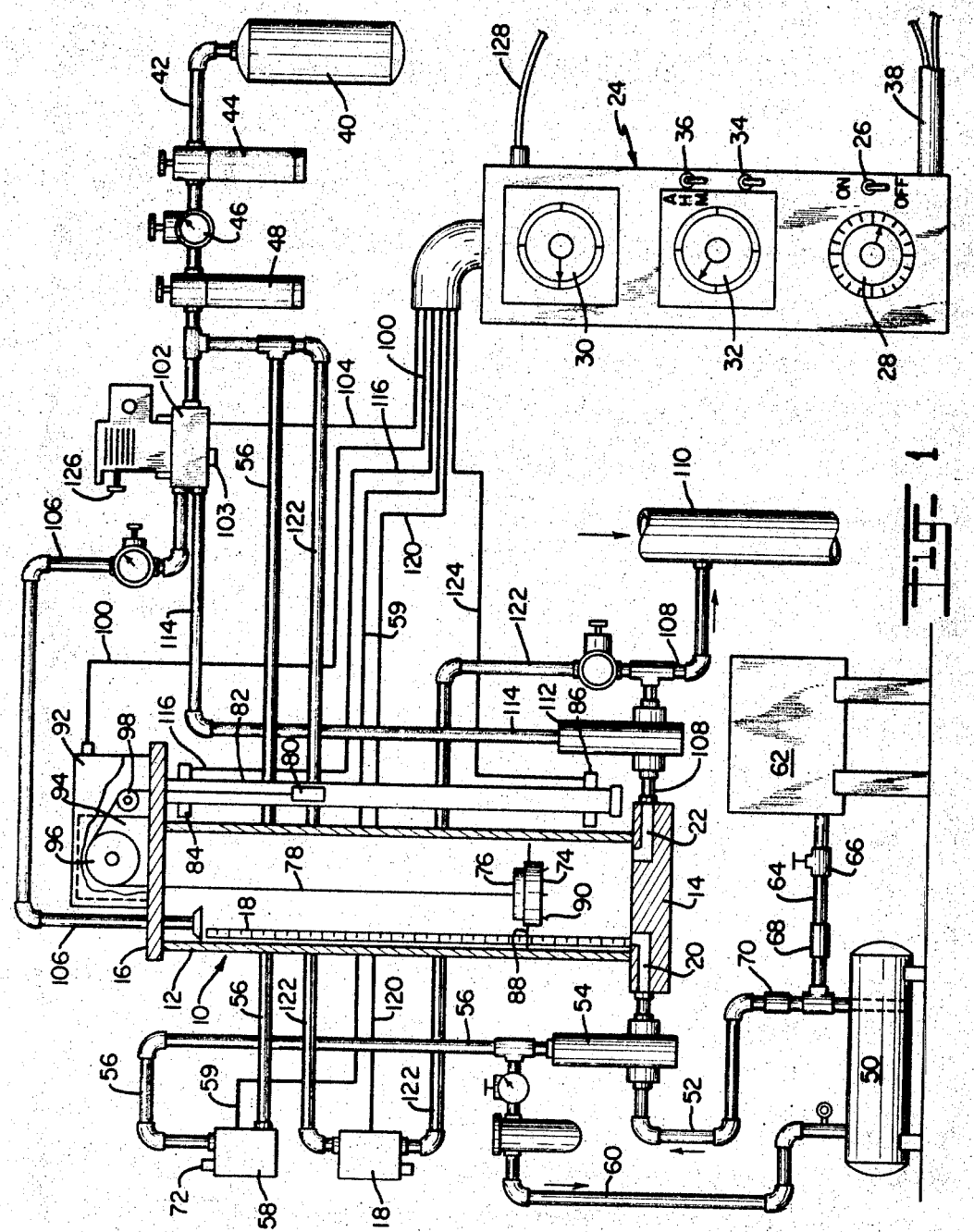

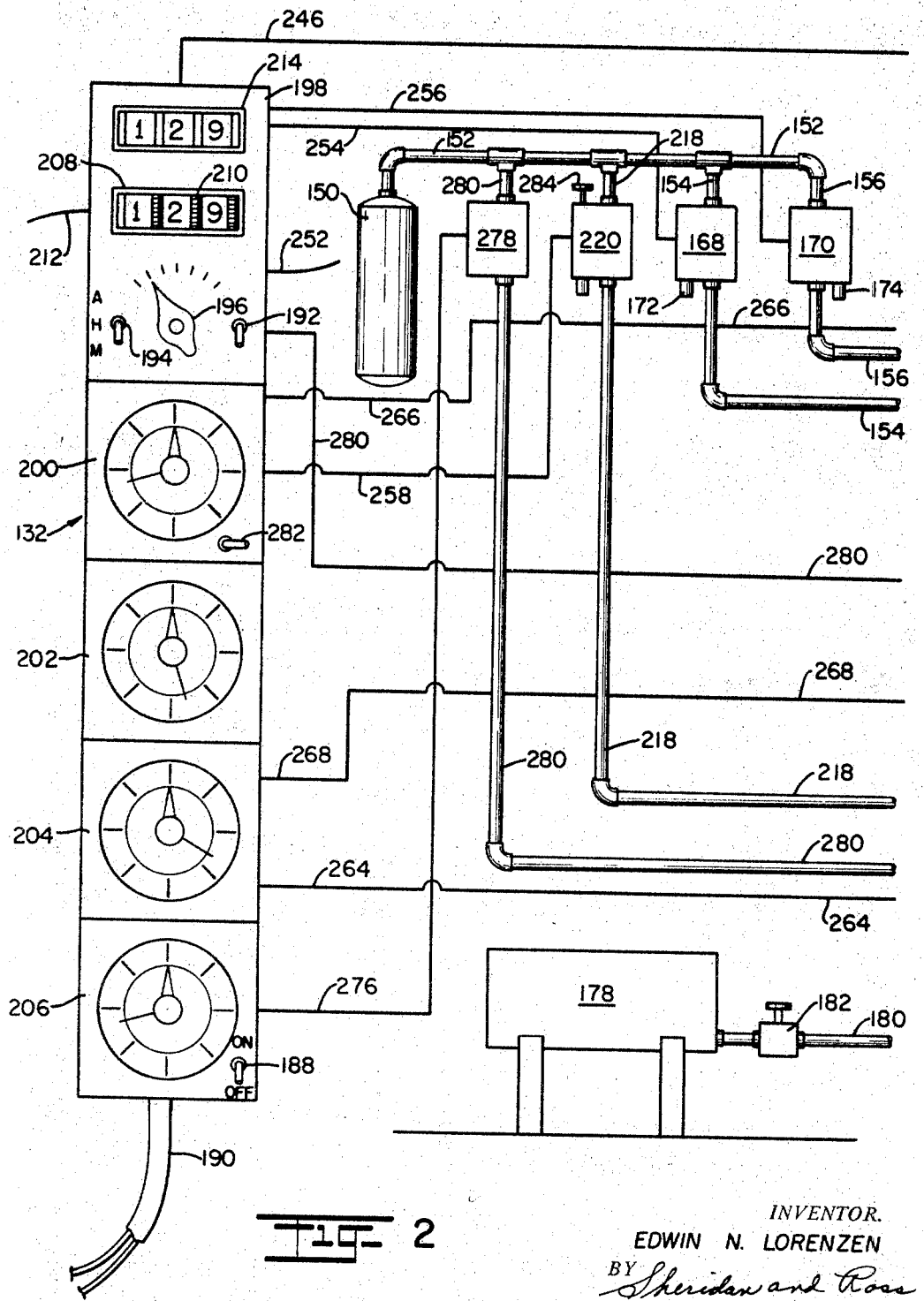

3,435,989
METHOD AND APPARATUS FOR MEASURING
AND DISPENSING LIQUIDS
Edwin N. Lorenzen, Littleton, Colo., assignor to Protex
Industries Inc., Denver, Colo., a corporation of
Colorado
Filed Dec. 16, 1966, Ser. No. 602,362
Int. Cl. G01f 11/44; B67d 5/22, 5/38
U.S. Cl. 222—1                                          24 Claims

ABSTRACT OF THE DISCLOSURE

This invention relates to a method and apparatus for measuring and dispensing liquids from a vertically disposed holding tube. The method of this invention comprises injecting a predetermined quantity of liquid into a vertically disposed holding tube, retaining the liquid in the tube for a preselected period of time to enable inspection and determination of the accuracy of measurement, applying gaseous pressure to the upper surface of the liquid to discharge forcibly same into a receiver, and injecting water into the upper end of the tube to wash down the walls and insure dispensing of all the measured liquid. The apparatus comprises a vertically extending holding tube having a base and a cap, a source of supply of pressurized liquid and pressurized gas, a liquid receiver, a plurality of conduits a first one of which interconnects the liquid source with the base of the tube and has a fill valve disposed therein and a second one of which interconnects the base of the tube and the receiver and has a pump valve disposed therein, and means for effecting removal of liquid to be disposed within the holding tube through said second conduit to the receiver, said liquid removal effecting means including a third conduit interconnecting the gas source with the cap of the tube and having a blowout valve mounted therein. The apparatus also includes cycle-initiating means actuatable to cause opening of the fill valve, interruptor means operating in response to a rise of liquid in the tube to a first predetermined level to cause closing of the fill valve, and control means for actuating the liquid removal effecting means and to cause opening of the dump valve, said control means being further operative in response to the fall of liquid in the tube to a second predetermined level to cause de-actuation of the liquid removal effecting means and to close the dump valve. The apparatus also includes a fourth conduit interconnecting a gas source and the second conduit downstream of the dump valve to provide a flow path for gas to purge the downstream portion of the second conduit, and a purge valve disposed in said fourth conduit to control flow therethrough. The apparatus also includes another conduit interconnecting the gas source and the other end of the fill valve to provide a flow path for gas to actuate the fill valve and has a fill control valve mounted therein. The means of the apparatus for effecting operation of the interruptor means includes a float supported by the liquid in the tube, a pulser carried by the cap and actuated by the float to produce a pulse for each of the increments of rise in the liquid level, and a counter adapted to receive and count the pulses of the pulser and to actuate the interrupter means. The apparatus also includes fail-safe means to prevent overflow of the holding tube. The apparatus also includes blowout control means. The apparatus also includes means to inject washout water into the upper end of the tube to wash down the walls during the period when the blowout valve and the dump valve are open.

Figure 2A:
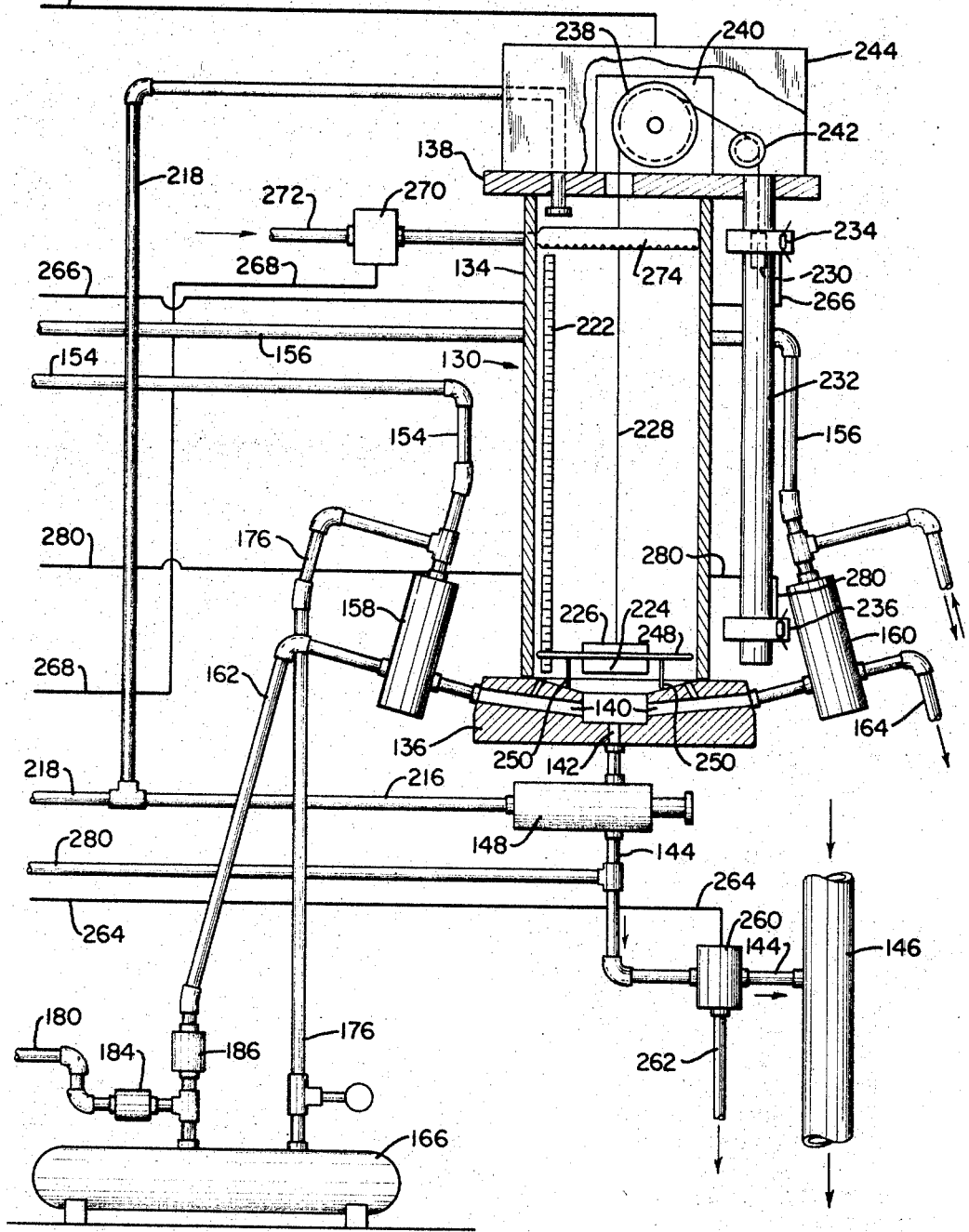

This invention lies in the general field of measuring and dispensing liquids for addition to measured quantities of other materials to make up mixtures having predetermined proportions of various ingredients to produce optimum results. While not so limited, it relates more particularly to method and apparatus for measuring and dispensing admixtures to be used in the preparation of concrete. It is directed primarily to method and apparatus for transmitting liquids to a container, measuring them with a high degree of accuracy, and dispensing them to a receiver while insuring that all of each liquid measure is delivered.

The many different uses of concrete today require various proportions of the common ingredients for the various jobs to be done and also frequently require the addition of special solutions, usually referred to as admixtures, to give concrete special characteristics or properties. These admixtures may be for water reducing, air entraining, set retarding, accelerating and other purposes. Very small quantities of these admixtures are used in proportion to the quantities of basic ingredients and it has been found essential to control the quantity of each admixture as accurately as possible in order to obtain optimum results.

Ordinarily, concrete is made up in batches and delivered to trucks which carry out the intermixing operation while they are transporting the material to the destination or instead the concrete ingredients may be completely mixed into a homogeneous mass in a central mixing plant and transported in a ready to use condition. The batches may vary from truck to truck and large semi-automatic or completely automatic systems are used extensively to measure and discharge the various ingredients into each waiting truck or mixer. An operator in a control room determines the requirements for each batch and makes the proper settings, after which the system automatically carries out the weighing and dispensing operations. Since each admixture has a very special and important effect on the final mix it is necessary not only to add the right quantity at a given time but also to insure that none of a particular admixture is left in the system to be incorporated in the subsequent mix which calls for a different admixture.

The present invention delivers the desired admixture liquid under pressure to a measuring chamber which measures the liquid quantity very accurately. Thereafter the desired amount of liquid is accurately dispensed to a receiver leading to the other ingredients and all of the liquid is forced into the receiver by a flow of pressurized air to insure that none of the liquid is left in the system to commingle with the next quantity of liquid which may be of a totally different nature to accomplish a different purpose.

Generally stated, the apparatus comprises a vertically extending holding tube having a base and a cap, a source of supply of the desired liquid under pressure, and a receiver for the measured quantity of liquid. A first conduit connects the liquid source to the base of the tube and is provided with a valve to control the liquid flow. A second conduit connects the base to the receiver and is provided with a valve to control the discharge flow. There is also a source of supply of gas under pressure, which is normally compressed air.

The fill valve is air actuated and is connected to the compressed air supply by another conduit containing a solenoid operated valve. The solenoid is energized by a switch which may be actuated manually or by a signal from the appropriate part of the batch mixing console. The solenoid remains energized by a holding circuit during the filling operation. In the presently preferred form, the measuring is accomplished by mechanism including a pulser and a pulse counter and a float to actuate the pulser. The float is provided with a damping weight and is connected by a fine cable or cord with a counterweight of sufficient magnitude that the float will be buoyant in the liquid to be measured. The pulser is of the rotary type and is provided with a pulley over which the float cord is trained. As the float rises, the pulley rotates and the pulser sends signals to the counter. The pulser may emit one signal for each fluid ounce although it is to be understood that such ratio may be varied and is not to be considered limiting. When the counter accumulates a pre-set number of counts it opens the holding circuit to de-energize the solenoid and cause the fill valve to close.

The dump valve is also air actuated and is connected by a conduit to a blowout valve which is in turn connected to the air source and is solenoid actuated. It is desirable to be able to visually check the accuracy of measurement before dispensing. To this end, the holding tube is preferably made of a transparent plastic and is provided with a calibrated scale. The liquid is held in the tube for a predetermined time by a dump delay timer and the latter is actuated by the counter simultaneously with the closing of the fill valve. The timer may be set to any value, say, from zero to about thirty seconds so that the delay can be eliminated entirely if desired. At the end of its timing cycle the timer energizes the solenoid which opens the blowout valve and consequently the dump valve. A holding circuit maintains the solenoid energized.

Another conduit leads from the blowout valve to the cap of the tube to deliver compressed air to the upper end of the tube while the blowout valve remains open. This air is applied to the upper surface of the liquid and forces it rapidly and completely out of the tube. As the float follows the liquid down, it raises the counterweight which travels in a vertical guide tube. A reed switch is located on a slidable collar near the top of the guide tube and when the counterweight, which is magnetic, becomes aligned with the switch it actuates the latter which sends a signal to open the holding circuit and close the blowout valve and dump valve. The collar can be raised or lowered to adjust the zero or empty point.

The signal from the reed switch also actuates a purge timer. A purge line or conduit is connected at one end with the compressed air source and at the other end with the dump conduit just downstream of the dump valve. A solenoid operated purge valve is provided in the line and is opened by the purge timer at the beginning of its timing cycle to force air through the downstream part of the dump line and insure that all of the liquid is carried to the receiver. When the timing cycle is completed the timer closes the purge valve and the apparatus is ready for use with a subsequent batch.

In a modification of the apparatus just described, a plurality of sources of different liquids are provided, each with a separate conduit leading to the base of the tube and with a separate valve for each conduit. The mechanism includes a selector switch to connect the actuating mechanism to a single one of the valves for supplying the desired one of the various liquids. To avoid carrying over any of one liquid into a subsequent batch requiring a different liquid a further step is introduced. When the measured liquid has been discharged from the tube, the blowout valve and dump valve are held open and wash-out water is injected into the upper end of the tube through a distributor and sprayed against the walls to wash down all traces of the liquid and drain them out through the dump line. The water is injected for a pre-set period of time with there being a slightly greater rate of inflow into the tube, that outflow therefrom whereby the water level in the tube rises thus carrying the float therewith. When the timer times out, the wash water is turned off, after which lowering of the float to the zero line causes closing of the blowout valve and dump valve. The purge operation is then carried out in the same way as in the first form.

Various other advantages and features of novelty will become apparent as the description proceeds in conjunction with the accompanying drawings, in which:

FIG. 1 is a schematic representation of one form of the apparatus of the invention; and FIGS. 2 and 2A are collectively, schematic representations of a modified form of the apparatus.

The apparatus illustrated in FIG. 1 includes a dispenser unit comprising a vertically extending holding tube 12, preferably formed of a clear plastic material, having a base 14 and a cap 16. A calibrated scale 18 may be mounted on the interior or exterior of the tube for measuring the height and volume of the liquid. If desired the scale may be vertically adjustable to set the zero point. A fill duct 20 and a dump duct 22 are formed in the base.

The various controls are mounted on a control console 24 and include a main power switch 26, a counter, or interruptor means, 28, a dump delay timer 30, a purge timer 32, a momentary start switch 34 and an auto-manual switch 36. Conductor 38 is connected to a conventional source of electric power.

A compressed air tank 40 serves as a source of supply of pressurized gas to operate various units and is provided with a discharge line 42 equipped with conventional filter, pressure regulator, and lubrication devices 44, 46, 48.

Liquid is supplied to the holding tube from a pressure feed tank 50 through conduit 52 which connects with fill duct 20. Flow through conduit 52 is controlled by a gas pressure actuated fill valve 54 connected by conduit 56 to the main air conduit 42. Air flow through conduit 56 is controlled by the solenid operated fill control valve 58. To commence the filling operation, momentary start switch 34 is depressed and closes a holding circuit through conductor means 59, including the solenoid of valve 58 and this also sets or cocks timers 30 and 32 to their respective pre-set time. The solenoid is energized to open valve 58 and remains energized during the filling operation. When the valve 58 is opened, pressurized gas flows to the fill valve 54, causing it to open and permit flow of solution into the tube. At the same time regulated air flows through conduit 60, connected to conduit 56, into tank 50 to pressurize it and cause liquid to flow upward through conduit 52 and enter tube 12.

Tank 50 is a high pressure tank and relatively small, holding somewhat more than the maximum capacity of the tube 12. For each operation it is filled with additional liquid by gravity from the much larger storage tank 62 by way of conduit 64 through manual shut-off valve 66 and check valve 68. Check valve 70 prevents return flow down through conduit 52 when pressure is relieved, and check valve 68 prevents return flow into tank 62 when the pressure is applied. After each filling operation the fill control valve 58 is closed to pressure and opened to exhaust through vent 72 which relieves the pressure in conduits 56 and 60 and tank 50, allowing gravity filling from tank 62.

Measurement and control of the amount of liquid entering tube 12 is accomplished with the use of float 74. The float is provided with a damping weight 76 and the latter is connected by means of a fine cable or cord 78 with a counterweight 80 which travels freely vertically in a nonmagnetic guide tube 82. The counterweight is made of magnetic material to actuate reed switches 84 and 86 on occasion for purposes to be described later. It is of substantially the same weight as damping weight 76 so that the net buoyancy of float 74 will enable it to rise and fall at the surface of the liquid in the tube. Integrally mounted circular vane 88 keeps the float centered in the tube, and fingers 90 space the float slightly from the base 14 in lowermost position so that it will rise freely when liquid enters. Vane 88 also acts to create surface tension on the surface of the liquid to prevent bobbing and in effect provide damping action.

An airtight housing 92 sealed to cap 16 contains the pulser 94 provided with a pulley 96 over which cord 78 is trained. Idler pulley 98 guides the cord into guide tube 82. As the float rises, the cord causes the pulley to rotate and the pulley in turn causes the pulser to emit pulse signals corresponding to increments in the volume of liquid in the tube. There is preferably one pulse for each fluid ounce of liquid admitted, which provides accuracy of a high order. Twenty or more pulses may be readily produced for each revolution of the pulley.

The pulses or pulse signals are transmitted through conductor 100 to the control console and into counter 28. When the counter reaches the pre-set number of counts the interruptor means incorporated therein opens the fill holding circuit and de-energizes the solenoid of the fill control valve 58. The valve closes and vents line 56, resulting in closure of fill valve 54 such as by conventional spring return means. Pressure in tank 50 is also relieved and it again fills by gravity.

The interruptor means simultaneously actuates dump delay timer 30 which has been pre-set and cocked to allow time for a visual check of the liquid level. When its timing cycle is completed it closes a holding circuit to solenoid-operated blowout valve 102 through conductor means 104. The blowout valve has an inlet connected to air line 42 and an outlet connected to conduit 106, which communicates with cap 16. When the valve 102 is opened, pressurized gas is injected into the upper end of the tube to forcibly discharge the liquid through dump duct 22.

Conduit 108 provides a flow path from the tube to receiver 110, which may be the conduit carrying water to the concrete mix. A dump valve 112 is incorporated in conduit 108 to control the flow and is operated by pressurized gas fed by conduit 114 which communicates with blowout valve 102, either directly as shown or by connection to conduit 106. The dump valve is therefore opened simultaneously with application of air pressure to the liquid, and the latter is rapidly ejected through conduit 108 to the receiver. When float 74 reaches the bottom of the tube at the zero mark, counterweight 80 has just reached the dump stop reed switch 84 and magnetically actuates it to send a signal back to the control console through conductor means 116. The signal acts to open the holding circuit through conductor means 104, the blowout valve solenoid is de-energized, the blowout valve and dump valve close, the pressure is relieved through vent 103.

The signal also actuates the purge timer 32 and closes a holding circuit to the solenoid of purge valve 118 through conductor means 120. The purge valve is incorporated in the purge conduit 122 which communicates at one end with air line 42 and at the other end with dump line 108 just downstream of dump valve 112. The solenoid opens the purge valve and compressed air passes through conduit 122 and through the downstream portion of conduit 108 to drive all of the liquid into the receiver. When the timing cycle of timer 32 is completed the timer opens the holding circuit, the solenoid is de-energized, and valve 118 is closed, completing the filling, measuring, and dispensing operation.

Since cap 16 is sealed to tubes 12 and 82 and the tubes are closed at their lower ends no seal is necessary for the openings in the cap which permit passage of cord 78 into and out of the housing 92 and there is no leakage of compressed air during the blowout operation.

In the unlikely event that the pulser or the counter and interruptor means should fail to function properly, further fail-safe means are provided to prevent overfilling of or accidental discharge from the holding tube. Reed switch 86 is located close to the lower end of guide tube 82, being so located that the counterweight 80 will just reach it when float 74 reaches the maximum safe level for the liquid. The counterweight magnetically actuates the switch to send a signal through conductor means 124 back to the console to open the holding circuit for the fill control valve and bring the filling operation to a halt. Further, the manual override button 126 on valve 102 is always available for manual actuation to carry out the dump and blowout operation.

The Auto-Manual switch 36 is useful in the case of malfunctions such as mentioned above. It has three positions, Manual, Hold, and Automatic. It is normally set in the automatic position, and a touch of the momentary start button 34 will cause a complete cycle to be performed. If it is desired to stop the operation at an intermediate point, the switch is moved to the hold position. Whenever it is moved back to the automatic position, the operation will resume. If it is desired or necessary for any reason, such as a malfunction, to operate manually, the switch 36 is moved to the manual position. Switch 34 may be held down to keep the fill valve open until the tube is filled to the proper level. As soon as switch 34 is released the rest of the cycle will continue to function.

When the system is set on automatic it may be started on each cycle by a signal transmitted through conductor means 128 from the major console or other remote signaling means rather than by operation of switch 34.

The details of circuitry to carry out the various functions described have not been shown in either form of the invention since they are all conventional and readily provided by those skilled in the art.

A more sophisticated version of the apparatus of FIG. 1 is illustrated in FIG. 2. While it may be operated on occasion in exactly the same way as the first form it is provided with additional elements which make it possible to use a single dispenser to selectively dispense different liquids to be added to different batches while insuring that they will not be commingled at any time.

The apparatus of FIG. 2 includes a dispensing unit 130 which is generally similar to dispensing unit 10 and a control console 132 which is generally similar to control console 24. The dispensing unit comprises a holding tube 134, preferably of clear plastic, a base 136, and a cap 138, all sealed in airtight relation. The base in this form is provided with a plurality of generally radial fill ducts 140. Only two are shown for example but there may be six or more depending on needs and the availability of space around the periphery. A single central downwardly directed dump duct 142 is provided, communicating with dump conduit 144 which leads to the receiver 146. As in the first form a gas pressure actuated dump valve 148 is incorporated in conduit 144.

Pressurized gas is supplied by air tank 150 which has a main air line 152. Branch conduits 154 and 156 lead to gas pressure actuated fill valves 158 and 160. The latter are incorporated in liquid fill conduits 162 and 164 which connect to air pressure feed tanks. Only one such tank, 166, is illustrated. It is to be understood that conduit 164 and the other liquid feed conduits not shown are all connected to similar sources of supply. Gas flow through conduits 154 and 156 is controlled by solenoid operated fill control valves 168 and 170, provided with vents 172 and 174.

Valves 168 and 170 are selectively operated to fill the holding tube with a selected liquid in the same fashion as in FIG. 1. For example, when valve 168 is opened, gas flows through conduit 154 to open valve 158. At the same time gas flows through branch conduit 176 to pressurize tank 166 and force liquid up through conduit 162. The rate of flow is controlled by pressure regulators 5 in the lines. A gravity feed tank 178 is connected to the pressure feed tank 166 through conduit 180, manual shut-off valve 182, and check valve 184. Conduit 162 is provided with check valve 186 and the pressure and fill operation is the same as in FIG. 1.

Control console 132 is provided with a main power switch 188 connected by conductor 190 to a conventional source of power, a momentary start switch 192, an auto-hold switch 194, a selector switch 196, a counter and interruptor means 198, a dump delay timer 200, a dump holding timer 202, a wash-out timer 204, and a purge timer 206. Unit 198 includes a pre-set counter 208 which may be set by means of thumb wheels 210 or by a signal from a remote device transmitted through conductor 212. The initial setting represents the desired number of counts or pulses which corresponds to the quantity of liquid which is to enter tube 134. A second pulse counter 214 starts each cycle at zero and counts pulses from the pulser to be described, and when its number corresponds to the number in counter 208 the interruptor signal is emitted.

The dump valve 148 is actuated by gas delivered through conduit 216 which communicates with conduit 218. The latter is connected at one end with main air line 152 and at the other end with the cap 138 to deliver pressurized gas to the upper end of the tube for forcibly discharging liquid. Solenoid operated blowout and dump valve 220 is incorporated in conduit 218 to control flow therethrough.

The fill measuring system is substantially identical to that of FIG. 1. A calibrated scale 222 is provided for visual checking. Float 224 has a damping weight 226 connected by a fine cable or cord 228 to counterweight 230 vertically movable in non-magnetic guide tube 232. Again the counterweight is magnetic to actuate the dump stop switch 234 at the upper end of the guide tube and the overfill safety switch 236 at the lower end of the guide tube. Cord 228 passes through cap 138, over pulley 238 of pulser 240, over idler pulley 242 and down through the cap. Housing 244 is sealed to the cap and encloses the pulser. Conductor 246 transmits pulse signals from the pulser to the pulse counter. The float is provided with vanes 248 and 250.

To commence operations, power switch 188 is moved to the "ON" position, selector switch 196 is set for the particular admixture liquid for the batch, switch 194 is set to "AUTO," and momentary start switch 192 is depressed to initiate the cycle. Alternatively, the cycle-initiating signal may be transmitted from a remote source by way of conductor 252. In either event, the signal closes a holding circuit, through conductor 254, with the solenoid of fill control valve 168, for example, and energizes the solenoid to open valve 168. Gas flows through conduit 154 to open valve 158 and also through conduit 176 to pressurize feed tank 166 and cause liquid to flow through conduit 162 into tube 134.

As float 224 rises at the upper surface of the liquid, cord 228 causes pulley 238 to rotate and actuate pulser 240. The pulses are transmitted through conductor 246 to counter 214. When the number on this counter matches the number on the pre-set counter, the interruptor means opens the holding circuit. The solenoid is de-energized and valve 168 closes to pressure and vents the line 154 leading to the fill valve and the feed tank, with the result that the fill valve closes and the feed tank re-fills by gravity. With a different setting of selector switch 196, a holding circuit would be closed through conductor 256 to actuate fill control valve 170, and the filling operation would be the same.

When the interruptor means de-energizes the fill control valve solenoid it simultaneously actuates the dump delay timer 200, which has been set to a desired value between zero and 30 seconds. During its timing cycle the liquid remains in the tube and its level can be visually checked for accuracy. When timer 200 times out it closes a holding circuit through conductor 258 and the solenoid of valve 220 to energize the solenoid and open the valve. Gas now flows through the valve and conduit 218 to apply pressure to the upper surface of the liquid. At the same time gas flows through conduit 216 to open dump valve 148, and the liquid is forcibly discharged through conduit 144 to receiver 146.

A diverter valve 260 is incorporated in line 144 and is biased to a position allowing flow to the receiver. It incorporates a solenoid for swinging it to a position to direct the flow through conduit 262 to waste. The solenoid is actuated by the wash-out timer 204 through a holding circuit including conductor 264.

As timer 200 actuates the valve 220 it simultaneously actuates the dump holding timer 202. The latter is set to allow enough time for all of the admixture liquid to leave the holding tube and pass to the receiver. When it times out, it actuates wash-out timer 204. At the initiation of its timing cycle, timer 204 actuates diverter valve 260 to open it to waste and also closes a circuit through conductor 268 and the solenoid of wash-out valve 270 to energize the solenoid and open the valve, permitting flow of wash water from a source of supply through conduit 272 and into water distributor head 274 in the upper end of the holding tube. The head sprays water on the walls and washes them down to remove all traces of the liquid which is being used for the particular batch. Timers 202 and 204 are connected to the holding circuit for valve 220 during hteir timing cycles to hold the circuit closed, thus keeping the dump line open. The rate of inflow of wash water is slightly greater than the rate of discharge so that the water level will gradually rise in the tube carrying the float upwards with it.

When the wash-out timer cycle is completed the timer opens the circuit to the wash-out solenoid, de-energizing the solenoid and closing the wash-out valve 270. The water continues to discharge through dump line 144 and float 224 falls with the water level until it reaches the zero position. At this point the magnetic counterweight 230 has reached the dump stop switch 234 and actuates it to send a signal through conductor 266 back to the dump delay timer 200 to open the holding circuit to valve 220, de-energizing the solenoid and closing the blowout valve and the dump valve 148. A small amount of clean water remains in the bottom of the tube, just up to the float level as shown, and serves as an indicator that the tube is clean and ready for another cycle.

The signal from switch 234 simultaneously actuates the purge timer 206. At the commencement of its timing cycle it closes a circuit through conductor 276 and the solenoid of purge valve 278 to open the valve and permit flow through conduit 280. The conduit connects at one end with the main air line 152 and at the other end with dump line 144 just downstream of the dump valve. The air clears the line of any remaining water or admixture fluid. At the termination of its timing cycle, timer 206 opens the circuit to the solenoid, de-energizing it and closing purge valve 278. Simultaneously it acts through timer 204 and conductor 264 to de-energize the solenoid of valve 260, allowing it to return to its position for delivery to receiver 146.

The safety measure against overfilling of the holding tube is the same as in FIG. 1. If a malfunction allows the liquid level to rise to the maximum safe point, counterweight 230 will fall to a point adjacent switch 236 and magnetically actuate it to send a signal through conductor 280 back to the interruptor means to open the circuit to the fill control valve, closing the valve and terminating the filling operation.

On occasions when it is not desired to include the wash-out and purge cycle, switch 282 is operated to by-pass timers 204 and 206. With this arrangement timer 200 will initiate the dump cycle at the termination of its timing cycle. Valve 220 in turn will be de-energized by the fall of the liquid to the zero level which causes the counterweight 230 to activate reed switch 234 to close the blowout and dump valves.

In event of a malfunction, or if manual operation is desired for some other reason, it may be carried out with start switch 192 in the same way as the system of FIG. 1. Also to be noted is the override button 284 comparable to button 126 in FIG. 1.

The holding circuits referred to are a convenient way of holding the various valves open for a period of time. However, other systems may be used if desired, such as double acting solenoids and over-center biasing means to maintain valves in either open or closed positions. Also throughout the fluid circuitry of both embodiments, conventional adjustable pressure regulators may be installed in the lines to control flow rates.

It will be apparent to those skilled in the art that various changes may be made in the construction and operation as disclosed without departing from the spirit of the invention. For example, the liquid may be dispensed from the holding tube other than by using compressed gas to eject same out from the bottom of said holding tube. As a matter of fact, the means for effecting removal of liquid from the holding tube may include compressed gas injected at the top of the tube, pumps or a vacuum applied at the bottom of the tube or any combination thereof. In addition to the foregoing, it will be appreciated that of necessity there is always a certain volume of liquid required to fill the conduits leading from the bottom of the holding tube. Where this particular volume exceeds the smallest amount of liquid to be measured and dispensed, it is important that this volume first be filled with a fluid, such as water, which can be added to the overall mixture without adversely affecting the results thereof. Thus, it will be understood that for measuring small amounts of liquid, it is necessary that the volume of the conduits and the like leading away from the bottom of the holding tube be filled with some acceptable fluid in order to provide a "reference point" which will permit the accurate measurement of the quantity of fluid involved.

In view of the foregoing, it is to be understood that all such changes in the construction and operation of the subject matter hereof as will be apparent to those skilled in the art are intended to be embraced within the scope of the following claims.

I claim:

1. Apparatus for measuring and dispensing liquids, comprising: a vertically extending holding tube having a base and a cap; a source of supply of a pressurized liquid; a source of supply of a pressurized gas; a liquid receiver; a first conduit communicating at one end with the liquid source and at the other end with the base to provide a flow path for liquid into the tube; a fill valve in the first conduit to control flow therethrough; a second conduit communicating at one end with the base and at the other end with the receiver to provide a flow path for discharge of liquid from the tube to the receiver; a dump valve in the second conduit to control flow therethrough; a third conduit communicating at one end with the gas source and at the other end with the cap to provide a flow path for gas into the upper end of the tube; a blowout valve in the third conduit to control flow therethrough; cycle-initiating means actuatable to cause opening of said fill valve; interruptor means operating in response to the rise of liquid in the tube to a first predetermined level to cause closing of said fill valve; blowout control means to cause opening of said blowout valve and said dump valve to forcibly eject liquid from the tube and deliver it to the receiver; said blowout control means being further operative in response to the fall of liquid in the tube to a second predetermined level to cause closing of said blowout valve and said dump valve; a fourth conduit communicating at one end with said gas source and at the other end with said second conduit downstream of said dump valve to provide a flow path for gas to purge the downstream portion of said second conduit; and a purge valve in said fourth conduit to control flow therethrough.

2. Apparatus as claimed in claim 1; and a purge timer actuated by the fall of liquid in the tube to said second predetermined level to cause opening of the purge valve; said timer being further operative to cause closing of the purge valve at the termination of a set time period.

3. Apparatus for measuring and dispensing liquids, comprising: a vertically extending holding tube having a base and a cap; a source of supply of a pressurized liquid; a source of supply of a pressurized gas; a liquid receiver; a first conduit communicating at one end with the liquid source and at the other end with the base to provide a flow path for liquid into the tube; a fill valve in the first conduit to control flow therethrough; a second conduit communicating at one end with the base and at the other end with the receiver to provide a flow path for discharge of liquid from the tube to the receiver; a dump valve in the second conduit to control flow therethrough; a third conduit communicating at one end with the gas source and at the other end with the cap to provide a flow path for gas into the upper end of the tube; a blowout valve in the third conduit to control flow therethrough; cycle-initiating means actuatable to cause opening of said fill valve; interruptor means operating in response to the rise of liquid in the tube to a first predetermined level to cause closing of said fill valve; the means for causing operation of the interruptor means including a float supported by the liquid in the tube; a pulser carried by the cap and actuated by the float to produce a pulse for each increment of rise of the fluid level; a counter adapted to receive and count the pulses from the pulser and to actuate the interruptor means upon the attainment of a predetermined total count representing a desired fluid level; and blowout control means to cause opening of said blowout valve and said dump valve to forcibly eject liquid from the tube and deliver it to the receiver; said blowout control means being further operative in response to the fall of liquid in the tube to a second predetermined level to cause closing of said blowout valve and said dump valve.

4. Apparatus for measuring and dispensing liquids, comprising: a vertically extending holding tube having a base and a cap; a source of supply of a pressurized liquid; a source of supply of a pressurized gas; a liquid receiver; a first conduit communicating at one end with the liquid source and at the other end with the base to provide a flow path for liquid into the tube; a fill valve in the first conduit to control flow therethrough; a second conduit communicating at one end with the base and at the other end with the receiver to provide a flow path for discharge of liquid from the tube to the receiver; a dump valve in the second conduit to control flow therethrough; a third conduit communicating at one end with the gas source and at the other end with the cap to provide a flow path for gas into the upper end of the tube; a blowout valve in the third conduit to control flow therethrough; cycle-initiating means actuatable to cause opening of said fill valve; interruptor means operating in response to the rise of liquid in the tube to a first predetermined level to cause closing of said fill valve; blowout control means to cause opening of said blowout valve and said dump valve to forcibly eject liquid from the tube and deliver it to the receiver; said blowout control means being further operative in response to the fall of liquid in the tube to a second predetermined level to cause closing of said blowout valve and said dump valve; said blowout control means including a dump delay timer actuated by the interruptor means to delay dumping of the liquid and allow time for visual inspection, and to cause opening of the blowout valve and dump valve at the termination of a set time period; the operating mechanism for said blowout valve including a solenoid energizable to open said blowout valve; and an electrical circuit connecting said solenoid to a source of power and including a holding circuit to maintain said solenoid energized; said dump delay timer being connected in said circuit and adapted to close the circuit and energize the solenoid upon termination of its timing cycle and to open the circuit and de-energize the solenoid in response to the fall of liquid in the tube to said second predetermined level.

5. Apparatus for measuring and dispensing liquids, comprising: a vertically extending holding tube having a base and a cap; a source of supply of a pressurized liquid; a source of supply of a pressurized gas; a liquid receiver; a first conduit communicating at one end with the liquid source and at the other end with the base to provide a flow path for liquid into the tube; a fill valve in the first conduit to control flow therethrough; said fill valve being gas pressure actuated; a second conduit communicating at one end with the base and at the other end with the receiver to provide a flow path for discharge of liquid from the tube to the receiver; a dump valve in the second conduit to control flow therethrough; a third conduit communicating at one end with the gas source and at the other end with the cap to provide a flow path for gas into the upper end of the tube; a blowout valve in the third conduit to control flow therethrough; cycle-initiating means actuatable to cause opening of said fill valve; interruptor means operating in response to the rise of liquid in the tube to a first predetermined level to cause closing of said fill valve; blowout control means to cause opening of said blowout valve and said dump valve to forcibly eject liquid from the tube and deliver it to the receiver; said blowout control means being further operative in response to the fall of liquid in the tube to a second predetermined level to cause closing of said blowout valve and said dump valve; a gas source-fill valve conduit communicating at one end with said gas source and at the other end with said fill valve to provide a flow path for gas to actuate said fill valve; and a fill control valve in said gas source-fill valve conduit to control flow therethrough.

6. Apparatus as claimed in claim 5; said liquid source comprising a pressure feed tank adapted to be filled by gravity from a storage tank and to be pressurized on occasion to supply liquid to said tube; and another conduit communicating at one end with the feed tank and at the other end with said gas source-fill valve conduit downstream of the fill control valve to provide a flow path for gas to pressurized said feed tank whenever the fill valve is open.

7. Apparatus as claimed in claim 5; the operating mechanism for said fill valve including a solenoid energizable to open the fill control valve; and an electrical circuit connecting said solenoid to a source of power and including a holding circuit to maintain said solenoid energized; said cycle-initiating means comprising a switch actuatable to energize the solenoid and close the holding circuit; and said interruptor means acting to open the holding circuit and de-energize said solenoid.

8. Apparatus for measuring and dispensing liquids, comprising: a vertically extending holding tube having a base and a cap; a source of supply of a pressurized liquid; a source of supply of a pressurized gas; a liquid receiver; a first conduit communicating at one end with the liquid source and at the other end with the base to provide a flow path for liqud into the tube; a fill valve in the first conduit to control flow therethrough; a second conduit communicating at one end with the base and at the other end with the receiver to provide a flow path for discharge of liquid from the tube to the receiver; a dump valve in the second conduit to control flow therethrough; a third conduit communicating at one end with the gas source and at the other end with the cap to provide a flow path for gas into the upper end of the tube; a blowout valve in the third conduit to control flow therethrough; cycle-initiating means actuatable to cause opening of said fill valve; interruptor means operating in response to the rise of liquid in the tube to a first predetermined level to cause closing of said fill valve; blowout control means to cause opening of said blowout valve and said dump valve to forcibly eject liquid from the tube and deliver it to the receiver; said blowout control means being further operative in response to the fall of liquid in the tube to a second predetermined level to cause closing of said blowout valve and said dump valve; and means to inject wash-out water into the upper end of the tube to wash down the walls during the period when the blowout valve and dump valve are open.

9. Apparatus for measuring and dispensing liquids, comprising: a vertically extending holding tube having a base and a cap; a source of supply of a pressurized liquid to be measured and dispensed; a source of supply of a pressurized gas; a source of supply of pressurized wash-out water; a liquid receiver for the dispensed liquid; a first conduit communicating at one end with the liquid source and at the other end with the base to provide a flow path for liquid into the tube; a fill valve in the first conduit to control flow therethrough; a second conduit communicating at one end with the base and at the other end with the receiver to provide a flow path for discharge of liquid from the tube to the receiver; a dump valve in the second conduit to control flow therethrough; a third conduit communicating at one end with the gas source and at the other end with the cap to provide a flow path for gas into the upper end of the tube; a blowout valve in the third conduit to control flow therethrough; a water distributor head mounted in the upper end of the tube; a fourth conduit communicating at one end with the water source and at the other end with the distributor head to provide a flow path for water to wash out the tube; a wash-out valve in the fourth conduit to control flow therethrough; cycle-initiating means actuatable to cause opening of said fill valve; interruptor means operating in response to the rise of liquid in the tube to a first predetermined level to cause closing of said fill valve; blowout control means to cause opening of said blowout valve and said dump valve to forcibly eject liquid from the tube and deliver it to the receiver; and wash-out control means to cause opening of said wash-out valve to deliver water to the upper end of said tube; said blowout control means being further operative in response to the fall of liquid in the tube to a second predetermined level to cause closing of said blowout valve and said dump valve.

10. Apparatus as claimed in claim 9; in which there are a plurality of sources of supply of a pressurized liquid; a conduit communicating between each source and said base; and a fill valve in each conduit; and selector means to place any single one of said fill valves under the control of said cycle-initiating means and said interruptor means at one time.

11. Apparatus as claimed in claim 9; said blowout control means including a dump delay timer and a dump holding timer; and said wash-out control means including a wash-out timer; said interruptor means operating to simultaneously cause closing of said fill valve and actuation of said dump delay timer; the latter acting upon termination of its timing cycle to simultaneously cause opening of said blowout valve and dump valve and actuation of said dump holding timer; the dump holding timer acting upon termination of its timing cycle to cause actuation of said wash-out timer; and the wash-out timer acting at the initiation of its timing cycle to cause opening of the wash-out valve and upon termination of its timing cycle to cause closing of the wash-out valve.

12. Apparatus as claimed in claim 11; and, in addition thereto, a fifth conduit communicating at one end with said gas source and at the other end with said second conduit downstream of said dump valve to provide a flow path for gas to purge the downstream portion of said second conduit; a purge valve in said fifth conduit to control flow therethrough; and a purge timer adapted to initiate a timing cycle upon closure of said blowout valve and dump valve and to cause opening of said purge valve, and adapted upon termination of its timing cycle to cause closing of said purge valve.

13. Apparatus as claimed in claim 12; and a diverter valve in said second conduit biased into a first position to direct flow to said receiver and swingable into a second position to divert flow to waste; said wash-out timer acting to cause swinging of said diverter valve to said second position simultaneously with opening of said wash-out valve; said wash-out timer and said purge timer acting to hold said diverter valve in said second position; and said purge timer acting upon termination of its timing cycle to release said diverter valve for return to said first position.

14. Apparatus as claimed in claim 12; said fill valve being gas pressure actuated; a sixth conduit communicating at one end with said gas source and at the other end with said fill valve to provide a flow path for gas to actuate said fill valve; and a fill control valve in said sixth conduit to control flow therethrough; said dump valve being gas pressure actuated; and a seventh conduit communicating with said dump valve and said blowout valve to provide a flow path for gas from said blowout valve to actuate said dump valve.

15. Apparatus as claimed in claim 14; the operating mechanism for said fill control valve including a solenoid energizable to open said fill control valve; and an electrical circuit connecting said solenoid to a source of power and including a holding circuit to maintain said solenoid energized; said cycle-initiating means comprising a switch actuatable to energize the solenoid and close the holding circuit; and said interruptor means acting to open the holding circuit and de-energize said solenoid and also to simultaneously actuate said dump delay timer; the operating mechanism for said blowout valve including a solenoid energizable to open said blowout valve; and an electrical circuit connecting said solenoid to a source of power and including a holding circuit to maintain said solenoid energized; said dump delay timer being connected in said circuit and adapted upon termination of its timing cycle to simultaneously close the holding circuit and energize the solenoid and actuate the dump holding timer; the operating mechanism for said wash-out valve including a solenoid energizable to open said wash-out valve; and an electrical circuit connecting said solenoid to a source of power; said wash-out timer being connected in said circuit and adapted upon initiation of its timing cycle to close the wash-out circuit and energize the wash-out solenoid; said dump holding timer acting upon termination of its timing cycle to actuate the wash-out timer; the latter acting upon termination of its timing cycle to open the wash-out circuit and de-energize the solenoid to close the wash-out valve; said dump delay timer being further operative in response to the fall of liquid in the tube to a second predetermined level to open the blowout valve holding circuit and de-energize the solenoid to close the blowout valve and dump valve and simultaneously to actuate the purge timer; the operating mechanism for said purge valve including a solenoid energizable to open said purge valve; and an electrical circuit connecting said solenoid to a source of power; said purge timer being connected in said circuit and adapted upon initiation of its timing cycle to close the purge circuit and energize the purge solenoid; said purge timer acting upon termination of its timing cycle to open the purge circuit and de-energize the purge solenoid to close the purge valve.

16. Apparatus as claimed in claim 15; and switch means to by-pass said dump holding timer and said wash-out timer and electrically connect said dump delay timer to said purge timer to eliminate the wash-out cycle and cause said apparatus to proceed directly from the dump operation to the purge operation.

17. A method of measuring and dispensing liquids in an apparatus having a vertically extending transparent holding tube, comprising: injecting liquid into said tube until its upper surface reaches a predetermined level corresponding to the quantity desired to be dispensed; retaining the liquid in said tube for a preselected period of time to enable inspection and determination of the accuracy of measurement; applying gaseous pressure to the upper surface of the liquid to forcibly discharge it into a receiver; and injecting water into the upper end of the tube to wash down the walls and insure dispensing of all of the measured liquid.

18. Apparatus for measuring and dispensing liquids, comprising: a vertically extending holding tube having a base and a cap; a source of supply of a pressurized liquid; a source of supply of a pressurized gas; a liquid receiver; a first conduit communicating at one end with the liquid source and at the other end with the base to provide a flow path for liquid into the tube; a fill valve in the first conduit to control flow therethrough; a second conduit communicating at one end with the base and at the other end with the receiver to provide a flow path for discharge of liquid from the tube to the receiver; a dump valve in the second conduit to control flow therethrough; means for effecting removal of liquid to be disposed within said holding tube from said tube through said second conduit to said receiver; said means for effecting removal of liquid from said holding tube including a third conduit communicating at one end with a gas source and at the other end with a cap to provide a flow path for gas into the upper end of the tube, and a blowout valve mounted in said third conduit to control flow therethrough; cycle-initiating means actuatable to cause opening of said fill valve; interruptor means operating in response to the rise of liquid in the tube to a first predetermined level to cause closing of said fill valve; control means for actuating of said means for effecting removal of liquid from said holding tube and to cause opening of said dump valve to forcibly eject liquid from the tube and deliver it to the receiver; said control means being further operative in response to the fall of liquid in the tube to a second predetermined level to cause de-actuation of said means for effecting removal of liquid from said tube and closing of said dump valve; a fourth conduit communicating at one end with said gas source and at the other end with said second conduit downstream of said dump valve to provide a flow path for gas to purge the downstream portion of said second conduit; and a purge valve in said fourth conduit to control flow therethrough.

19. Apparatus as claimed in claim 18; and fail-safe means to prevent overflow of the holding tube comprising means operating in response to the rise of liquid in the tube to a maximum safe capacity level to de-activate the apparatus and cause closing of the fill valve.

20. Apparatus as claimed in claim 18; said dump valve being gas pressure actuated; and conduit means communicating with said dump valve and said blowout valve to provide a flow path for gas from said blowout valve to actuate the dump valve.

21. Apparatus as claimed in claim 18; said blowout control means including a dump delay timer actuating by said interruptor means to delay dumping of the liquid and allow time for visual inspection; and to cause opening of the blowout valve and dump valve at the termination of a set time period.

22. Apparatus for measuring and dispensing liquids, comprising: a vertically extending holding tube having a base and a cap; a source of supply of pressurized liquid; a source of supply of a pressurized gas; a liquid receiver; a first conduit communicating at one end with the liquid source and at the other end with the base to provide a flow path for liquid into the tube; a fill valve in the first conduit to control flow therethrough; said fill valve being gas pressure actuated; a second conduit communicating at one end with the base and at the other end with the receiver to provide a flow path for discharge of liquid from the tube to the receiver; a dump valve in the second conduit to control flow therethrough; means for effecting removal of liquid to be disposed within said holding tube from said tube through said second conduit to said receiver; said means for effecting removal of liquid from said holding tube including a third conduit communicating at one end with a gas source and at the other end with said cap to provide a flow path for gas to the upper end of the tube, and a blowout valve mounted in said third conduit to control flow therethrough; a gas source-fill valve conduit communicating at one end with said gas source and at the other end with said fill valve to provide a flow path for gas to actuate said fill valve; and a fill control valve in said gas source-fill valve to control flow therethrough.

23. Apparatus for measuring and dispensing liquids, comprising: a vertically extending holding tube having a base and a cap; a source of supply of a pressurized liquid; a source of supply of a pressurized gas; a liquid receiver; a first conduit communicating at one end with the liquid source and at the other end with the base to provide a flow path for liquid into the tube; a fill valve in the first conduit to control flow therethrough; a second conduit communicating at one end with the base and at the other end with the receiver to provide a flow path for discharge of liquid from the tube to the receiver; a dump valve in the second conduit to control flow therethrough; means for effecting removal of liquid to be disposed within said holding tube from said tube through said second conduit to said receiver; cycle-initiating means actuatable to cause opening of said fill valve; interruptor means operating in response to the rise of liquid in the tube to a first predetermined level to cause closing of said fill valve; control means for actuating of said means for effecting removal of liquid from said holding tube and to cause opening of said dump valve to forcibly eject liquid from the tube and deliver it to the receiver; said control means being further operative in response to the fall of liquid in the tube to a second predetermined level to cause de-actuation of said means for effecting removal of liquid from said tube and closing of said dump valve; a source of supply of pressurized wash-out water; a water distributor head mounted within the upper end of the tube; conduit means communicating at one end with the water source and at the other end with the distributor head to provide a flow path for water to wash out the tube; a wash-out valve mounted in said conduit means to control flow therethrough; and wash-out control means to cause opening of said wash-out valve to deliver water to the upper end of said tube.

24. Apparatus as claimed in claim 23; the means for causing operation of the interrupter means including a float mounted within said tube, said float including damping weight means, means for centering said float within said tube and to create surface tension on the surface of the liquid to be disposed within said tube, and fingers depending from said float; a pulser carried by the cap and actuated by vertical movement of said float within said tube to produce a pulse for each increment of vertical rise of the fluid level within said tube; a counter constructed to receive and count the pulses from said pulser and to actuate the interrupter means upon the attainment of a predetermined total count representing a desired fluid level; a vertically disposed non-magnetic guide tube; a counterweight formed from a magnetic material, said counterweight being constructed for vertical movement within said guide tube, said counterweight being connected to said float whereby said counterweight and said float move in unison but in opposite vertical directions.

References Cited

UNITED STATES PATENTS

| | | | |
|---|---|---|---|
| 1,430,189 | 9/1922 | Rinaldi | 222—51 |
| 1,945,725 | 2/1934 | Bonney | 222—61 |
| 2,669,941 | 2/1954 | Stafford | 222—373 XR |
| 2,696,217 | 7/1954 | Hood | 222—61 XR |
| 2,887,038 | 5/1959 | Rosander | 222—373 XR |
| 3,208,637 | 9/1965 | Heick | 222—70 |
| 3,322,306 | 5/1967 | Munderich | 222—373 |

WALTER SOBIN, *Primary Examiner.*

U.S. Cl. X.R.

222—51, 56, 61, 70, 157, 30